Patented July 31, 1928.

1,678,721

UNITED STATES PATENT OFFICE.

GUY H. BUCHANAN, OF WESTFIELD, AND PALMER W. GRIFFITH, OF ELIZABETH, NEW JERSEY, ASSIGNORS TO AMERICAN CYANAMID COMPANY, OF NEW YORK, N. Y., A CORPORATION OF MAINE.

PROCESS OF RECOVERING COMBINED NITROGEN FROM CRUDE CALCIUM CYANAMIDE.

No Drawing. Application filed February 29, 1924. Serial No. 696,070.

This invention relates to a process of recovering combined nitrogen from crude calcium cyanamide or lime nitrogen and has for its object to render more efficient the procedures heretofore proposed.

With these and other objects in view, the invention consists in the novel steps and combinations of steps constituting the process, all as will be more fully hereinafter disclosed and particularly pointed out in the claims.

In order that the invention may be the more clearly understood it is said:—

The methods heretofore proposed for the production of cyanamide $H_2CN_2$ or a solution of cyanamide from lime nitrogen have involved either extracting the lime nitrogen with water, or treating it with an acid solution. We have found, on the other hand, that a complete extraction of the nitrogen values of lime nitrogen by the use of either water or acids is difficult to obtain. It has also been our experience that except under special conditions it is not economical to treat lime nitrogen with an acid because lime nitrogen contains large quantities of lime compounds and the neutralization of these said compounds not only consumes large quantities of the acid, employed, but it forms compounds which dilute the resulting product.

In attempting to extract a substantial portion of the combined nitrogen in lime nitrogen we have further found that in order to secure a complete extraction and at the same time avoid the formation of substantial quantities of dicyandiamide and other undesirable transformation products of cyanamide, it has been necessary to work with dilute solutions of cyanamide $H_2CN_2$, and this results in greatly increased evaporation costs.

In this invention, on the other hand, we avoid these objections by employing relatively strong solutions or by extracting lime nitrogen with somewhat less than the usual amount of water. That is, at first we employ say 1 part of crude calcium cyanamide to 3 parts of water, and then autoclave the sludge in order to recover the unextracted nitrogen values. By thus first making a relatively strong solution of cyanamide we avoid the excessive costs of evaporating the dilute solutions heretofore employed and by autoclaving the residue of combined nitrogen left in the sludge we avoid the loss of said nitrogen as has been the custom heretofore, while the whole procedure avoids the making of any excessive quantities of dicyandiamide as has been the case heretofore.

As an alternative process, we may also add the crude calcium cyanamide to a water solution to which is added a reagent such as sulphuric acid, or carbon dioxide, which has the property of forming an insoluble compound with the calcium with which the cyanamide is associated and simultaneously liberating combined nitrogen. In this alternative case, we prefer to so proportion the rates of addition of crude calcium cyanamide and the reagent that the hydrogen concentration of the solution is maintained between the limits $10^2$ normal and $10^8$ normal, but said hydrogen ion concentration may be above or below these limits depending on the product we wish to make, all as is disclosed in a copending application Sr. No. 691,478, entitled Process of producing cyanamide, filed by George Barsky and Palmer W. Griffith on the 8th day of February, 1924.

In practice, we prefer to vary the proportions of water to crude calcium cyanamide both in this alternative procedure, and in the first mentioned procedure according to the capacity and kind of equipment available for the extraction. In case we separate the soluble extract from the insoluble precipitates by means of a filter press or similar device, we may pump into said press the mixture of water and lime nitrogen after they have been thoroughly mixed, and the temperature during the mixing is preferably prevented from rising above 40° C. We then withdraw a substantial portion of the soluble extract, which we prefer to treat further as disclosed in the above named copending application, entitled Process of producing cyanamide, so as to form a stable solution of cyanamide which may be used immediately or stored as desired. The sludge from the filtering operation in both cases we autoclave to recover the nitrogen values thereof in the form of ammonia.

It will now be clear that the primary advantage of this process is that the combination of steps disclosed, permits the production of strong solutions of cyanamide $H_2CN_2$ substantially free from undesirable decomposition products of cyanamide, and at the same time permits the recovery of substantially all the nitrogen values of the cyanamide. These results have never heretofore been obtained in so far as we are aware. In case no acid is used, the cyanamide solution should be, as above stated, about 1 part of crude calcium cyanamide to 3 parts by weight of water, but these proportions may be one part of calcium cyanamide to one to four parts of water. In the case of the use of an acid, these proportions may vary between one part of crude calcium cyanamide to one part of acid, and one part of said cyanamide to three parts of acid.

As above stated, in order to prepare by the methods heretofore known, a solution of cyanamide $H_2CN_2$ substantially free from undesirable decomposition products, it has been necessary to produce a solution so dilute that the subsequent utilization of the solution was uneconomical, because of high evaporation costs. The result has been essentially the same when it was attempted to extract substantially all the soluble nitrogen values of lime nitrogen.

According to this invention, on the other hand, the solution is never more dilute than say 5% cyanamide, when water is used and never more dilute than say 10% cyanamide when an acid is used. These solutions are found not to be prohibitive as to evaporation costs and at the same time not to produce decomposition products. In other words, it is also well known that the maximum nitrogen that can be commercially extracted in practice from lime nitrogen according to the prior procedures, is but from 92% to 94% of the total values present. In this invention, on the other hand, one not only produces solutions of cyanamide, substantially free from undesirable decomposition products thereof, but he produces strong solutions that can be evaporated within the limits of costs, and at the same time he recovers not only the soluble nitrogen values but recovers those which have never heretofore been commercially recoverable.

It is obvious that those skilled in the art may vary the details of the procedure without departing from the spirit of the invention, and therefore, it is not desired to be limited to the foregoing disclosure except as may be required by the claims.

What is claimed is:—

1. The process of recovering combined nitrogen which consists in providing a mixture of lime nitrogen and water containing between 100 parts and 400 parts of water by weight to each 100 parts of lime nitrogen; filtering the solution thus obtained; and subjecting the solids separated out to the action of an autoclave in the presence of additional water.

2. The process of recovering combined nitrogen from crude calcium cyanamide which consists in mixing said calcium cyanamide with water in the proportions of 100 pounds of crude calcium cyanamide to from 100 pounds to 400 pounds of water; agitating the mixture thus produced; separating out any solids present in said solution; adding water to said solids; and subjecting the mixture to the action of an autoclave to recover any combined nitrogen present; and recovering from said first named solution its content of cyanamide.

3. The process of recovering combined nitrogen which consists in providing a mixture of lime nitrogen and water containing between 100 parts and 300 parts of water by weight to each 100 parts of lime nitrogen; adding to said mixture an acid capable of forming an insoluble compound with the calcium present; filtering the solution of cyanamide thus obtained; and subjecting the solids separated out to the action of an autoclave in the presence of additional water.

4. The process of recovering combined nitrogen from crude calcium cyanamide, which consists in mixing said calcium cyanamide with water in the proportions of 100 pounds of crude calcium cyanamide to from 100 pounds to 300 pounds of water; adding to said mixture a reagent capable of forming an insoluble compound with the calcium present; agitating the mixture thus produced to obtain a crude solution of cyanamide; separating out any solids present in said solution; adding water to said solids and subjecting the latter to the action of an autoclave to recover any combined nitrogen present.

5. The process of recovering combined nitrogen which comprises extracting lime nitrogen with water to remove a portion of the soluble constituents thereof, and treating with water the remainder of the soluble constituents together with the insoluble constituents at superatmospheric temperatures and pressures, substantially as described.

6. The process of recovering combined nitrogen from crude calcium cyanamide which comprises extracting lime nitrigen with water to dissolve a portion of the cyanamide present; separating out any solids left in the solution from the cyanamide in said solution; treating said solids with an additional quantity of water under super-atmospheric pressure; and recovering the combined nitrogen thus obtained from said solids.

7. The process of recovering combined nitrogen from crude calcium cyanamide which comprises extracting the calcium cyanmide under conditions and with an amount of aqueous liquid insufficient to dissolve substantially all the cyanamide, separating out the solids and digesting the same with an additional amount of liquid to recover practically all of the remaining nitrogen as ammonia.

8. The process of recovering combined nitrogen from crude calcium cyanamide which comprises extracting the calcium cyanamide under conditions and with an amount of water insufficient to dissolve substantially all the cyanamide, separating out the solids and digesting the same with an additional amount of water to recover practically all of the remaining nitrogen as ammonia.

9. The process of recovering combined nitrogen from crude calcium cyanamide which comprises extracting the calcium cyanamide with about three parts of an aqueous liquid, separating out the solids and digesting the same with an additional amount of aqueous liquid to recover practically all of the remaining nitrogen as ammonia.

10. The process of recovering combined nitrogen from crude calcium cyanamide which comprises extracting the calcium cyanamide with about three parts of an aqueous liquid, at a temperature below 40° C., separating out the solids and digesting the same with an additional amount of aqueous liquid to recover practically all of the remaining nitrogen as ammonia.

In testimony whereof we affix our signatures.

GUY H. BUCHANAN.
PALMER W. GRIFFITH.